(12) United States Patent
Simha et al.

(10) Patent No.: US 9,469,395 B1
(45) Date of Patent: Oct. 18, 2016

(54) MULTI-LAYER BODY WITH ACTIVE MITIGATION FOR TURBULENCE REDUCTION

(71) Applicants: Arnav Simha, Great Falls, VA (US);
Jacob Brower, Alexandria, VA (US);
Douglas Andre, Oakton, VA (US);
Clinton Behling, Springfield, VA (US)

(72) Inventors: Arnav Simha, Great Falls, VA (US);
Jacob Brower, Alexandria, VA (US);
Douglas Andre, Oakton, VA (US);
Clinton Behling, Springfield, VA (US)

( * ) Notice: Subject to any disclaimer, the term of this patent is extended or adjusted under 35 U.S.C. 154(b) by 0 days.

(21) Appl. No.: 15/069,620

(22) Filed: Mar. 14, 2016

(51) Int. Cl.
| | |
|---|---|
| B64C 23/00 | (2006.01) |
| B64C 1/06 | (2006.01) |
| B64C 19/00 | (2006.01) |
| B64D 11/00 | (2006.01) |
| B60L 1/00 | (2006.01) |
| B60L 13/04 | (2006.01) |
| H02N 15/00 | (2006.01) |

(52) U.S. Cl.
CPC ............ *B64C 23/005* (2013.01); *B60L 1/00* (2013.01); *B60L 13/04* (2013.01); *B64C 1/068* (2013.01); *B64C 19/00* (2013.01); *B64D 11/00* (2013.01); *H02N 15/00* (2013.01); *B60L 2270/145* (2013.01); *B60L 2270/147* (2013.01)

(58) Field of Classification Search
CPC ..... B64C 23/005; B64C 1/068; B64C 19/00; B64C 1/40; B64C 1/403; B64C 2220/00; B64C 13/16; B64D 11/00; B64D 7/00; B64D 31/06; G06F 3/0346; B60L 1/00; B60L 13/04; B60L 2200/10; B60L 2200/26; B60L 2200/36; B60L 2270/145; B60L 2270/147; B60R 16/037; F16C 32/041; F16C 32/0423; F16C 32/0444; F16C 32/0446; F16C 32/0451; B61F 13/00; B61C 13/00; A63H 33/26; H02N 13/15; H02N 15/00; F16F 15/03; F16F 15/18; F16F 6/00; F16F 2222/06; G05D 1/0615; B63B 17/0081; B63B 39/00; B63B 39/005; B63B 39/02; B63B 39/04

See application file for complete search history.

(56) References Cited

U.S. PATENT DOCUMENTS

| | | | | |
|---|---|---|---|---|
| 3,439,546 A | * | 4/1969 | Bose | ............... G01C 19/20 74/5.6 D |
| 3,842,751 A | * | 10/1974 | Thornton | ............... B60L 13/10 104/130.02 |

(Continued)

*Primary Examiner* — Thomas G Black
*Assistant Examiner* — Sze-Hon Kong
(74) *Attorney, Agent, or Firm* — Sheppard Mullin Richter & Hampton LLP

(57) ABSTRACT

A multi-layered body system, including an inner body and an outer body, reduces the effects of turbulence on a vehicle by generating a counteracting force that stabilizes the inner body. During operation of the vehicle, the inner body may be electromagnetically levitated within the outer body using mitigation devices, such as powered electromagnets. Such electromagnetic levitation may cause the outer body to absorb turbulent force, which may be absorbed throughout the outer body and/or cause the outer body to move (e.g., toward the inner body). The system may include sensors that detect turbulent force imposed on the outer body. A computer may calculate a counteracting force that should be applied based on the detected turbulent force, and cause a mitigating device to output the counteracting force. The counteracting force may be provided to resume EM levitation within operational parameters.

19 Claims, 7 Drawing Sheets

(56) References Cited

U.S. PATENT DOCUMENTS

| | | | | |
|---|---|---|---|---|
| 3,882,790 A * | 5/1975 | Winkle | ............... | B60L 13/10 104/281 |
| 4,072,110 A * | 2/1978 | Jayawant | ............... | F16F 6/00 104/130.02 |
| 4,273,054 A * | 6/1981 | Yamashita | ............... | B60L 13/04 104/281 |
| 4,441,375 A * | 4/1984 | Minohara | ............... | G01C 19/20 33/327 |
| 5,388,527 A * | 2/1995 | Thornton | ............... | B60L 13/04 104/284 |
| 5,445,249 A * | 8/1995 | Aida | ............... | F16F 15/03 188/267 |
| 5,609,230 A * | 3/1997 | Swinbanks | ............... | F16F 15/03 188/267 |
| 6,044,770 A * | 4/2000 | Davey | ............... | B60L 13/10 104/282 |
| 6,374,746 B1 * | 4/2002 | Fiske | ............... | B61B 13/10 104/138.1 |
| 6,487,061 B1 * | 11/2002 | Swinbanks | ............... | F16F 15/03 361/143 |
| 6,575,669 B2 * | 6/2003 | Takasan | ............... | G10K 15/00 198/630 |
| 9,061,761 B2 * | 6/2015 | Belisle | ............... | B64C 39/001 |
| 9,156,564 B2 * | 10/2015 | Endres | ............... | B64F 1/04 |
| 2002/0179385 A1 * | 12/2002 | Tryggvason | ............... | F16F 15/03 188/266.1 |
| 2004/0024503 A1 * | 2/2004 | Swinbanks | ............... | B63B 17/0081 701/36 |
| 2005/0278094 A1 * | 12/2005 | Swinbanks | ............... | B63B 17/0081 701/37 |
| 2008/0029368 A1 * | 2/2008 | Komori | ............... | B60L 13/04 198/619 |
| 2009/0229487 A1 * | 9/2009 | Crawford | ............... | B60L 13/04 104/281 |
| 2012/0112590 A1 * | 5/2012 | Letang | ............... | B60L 13/04 310/90.5 |
| 2015/0033804 A1 * | 2/2015 | Fukui | ............... | D06F 37/22 68/140 |
| 2015/0252864 A1 * | 9/2015 | Hull | ............... | F16F 7/1011 188/267 |

* cited by examiner

MULTI-LAYER BODY WITH ACTIVE MITIGATION FOR TURBULENCE REDUCTION

FIELD OF THE INVENTION

The invention relates to systems and methods of using a multi-layered body system that includes an inner body and an outer body to reduce the effects of turbulence on a vehicle by generating a counteracting force that stabilizes the inner body.

BACKGROUND OF THE INVENTION

Vehicles such as, among other, airplanes, trains, and marine vessels are subjected to turbulent forces (e.g., turbulence). Turbulence can lead to injuries, motion sickness, and other discomfort for passengers and potential damage to cargo and vehicular components. Reducing or eliminating turbulence would be desirable.

These and other drawbacks exist with conventional vehicles that may experience turbulence.

SUMMARY OF THE INVENTION

The invention relates to systems and methods of using a multi-layered body system that includes an inner body and an outer body to reduce the effects of turbulence on a vehicle by generating a counteracting force that stabilizes the inner body, according to an implementation of the invention. A vehicle may include the multi-layered body system.

In some implementations, during operation of the vehicle (e.g., during flight) the inner body may be electromagnetically levitated within the outer body using mitigation devices, such as powered electromagnets. Such electromagnetic ("EM") levitation may cause the outer body to absorb turbulent force, which may be absorbed throughout the outer body and/or cause the outer body to move (e.g., toward the inner body). Because the inner body is levitated within the outer body during operation, the turbulent force felt by passengers or objects inside a compartment of the inner body may be reduced or eliminated. In some instances, during EM levitation, the inner body does not come into physical contact with the outer body. The system may constantly maintain EM levitation such that any movement of the outer body with respect to the inner body is automatically counteracted due to the constant EM levitation.

In some implementations, whether or not such EM levitation is used, the system may include sensors that detect turbulent force imposed on the outer body. The system may calculate a counteracting force that should be applied based on the detected turbulent force. The system may generate a mitigating signal based on the counteracting force to be applied, and provide the mitigating signal to one or more mitigating devices, which produce the counteracting force based on the mitigating signal. The mitigating devices may include EM devices that produce a counteracting EM force, hydraulic devices that produce a counteracting hydraulic force, and/or other types of devices that are able to produce variable or constant force. The counteracting force may be applied, for example, to restore EM levitation to a state that existed prior to the turbulent force, and/or to prevent the outer body from contacting the inner body or otherwise reduce the impact of any such contact.

In some implementations, the system may cause the mitigating devices to produce one or more counteracting forces to maintain a minimum separation distance between the outer body and the inner body. Alternatively or additionally, the system may cause the mitigating devices to produce one or more counteracting forces in response to any detected movement of the outer body with respect to the inner body.

In some implementations, the multi-layered body system may include a multi-layer body support subsystem. The multi-layer body support subsystem may include an outer body support and an inner body support. The outer body support may include a plurality of beam retaining grooves, which each may be notched into outer body support or cast with such support grooves during manufacturing. One beam retaining groove may be configured to receive a proximal end of body support beam. Another beam retaining groove from an opposing outer body support may be configured to receive a distal end of body support beam. The outer portion of outer body supports and body support beam(s) may be encased in an outer shell, which forms the shape of a vehicle. In these implementations, the outer body may comprise a plurality of outer body supports, a plurality of body support beam(s) that are retained by the outer body supports, and the outer shell.

In some implementations, the inner body may include a plurality of (inner) beam retaining grooves that are manufactured and function in a manner similar to that of outer body support. For example, (inner) body support beam(s) may be retained by beam retaining grooves. An inner portion of the inner body supports and corresponding body support beam(s) may be encased in an inner shell, which may form the shape of the cabin for passengers and/or cargo. In some instances, the outer portion of the inner body supports and corresponding body support beam(s) may be encased by a shell as well. In some implementations, the body support beam(s) retained by inner body supports may not include a mitigating device. In these implementations, such body support beam(s) may not have mitigating device receptacles. In these implementations, only the outer body will have mitigating devices. In some implementations, only the inner body will have mitigating devices. In some implementations, both the inner body and the outer body will have mitigating devices. In some implementations, the body support beam(s) for both the inner body support and the outer body support may be similarly sized. In other implementations, the body support beam(s) for both the inner body support and the outer body support may be differently sized.

In some implementations, a body support beam may include a mitigating device receptacle that houses a mitigating device, such as an electromagnet. Another body support beam may be joined together with body support beam such that each mitigating device receptacle, when aligned together, encapsulates the mitigating device. The two body support beams may be mechanically joined together by bolts, screws, or other fasteners that are inserted through through-holes. Alternatively or additionally, the two body support beams may be joined together by welding. In some implementations, a mitigating device receptacle may be bored into a single support beam such that two portions of support beams need not be fastened together. In these implementations, the mitigating device receptacle may be covered by a cover portion (or not covered at all).

In some implementations, the multi-layer body system may include a suspension that suspends the inner body with respect to the outer body. Such suspension may temporarily (e.g., when EM levitation is not activated) or permanently mechanically couple the inner body with the outer body. The suspension may be composed of compliant members that may passively mitigate turbulence either alone, or in combination with active mitigation using mitigating devices described herein.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
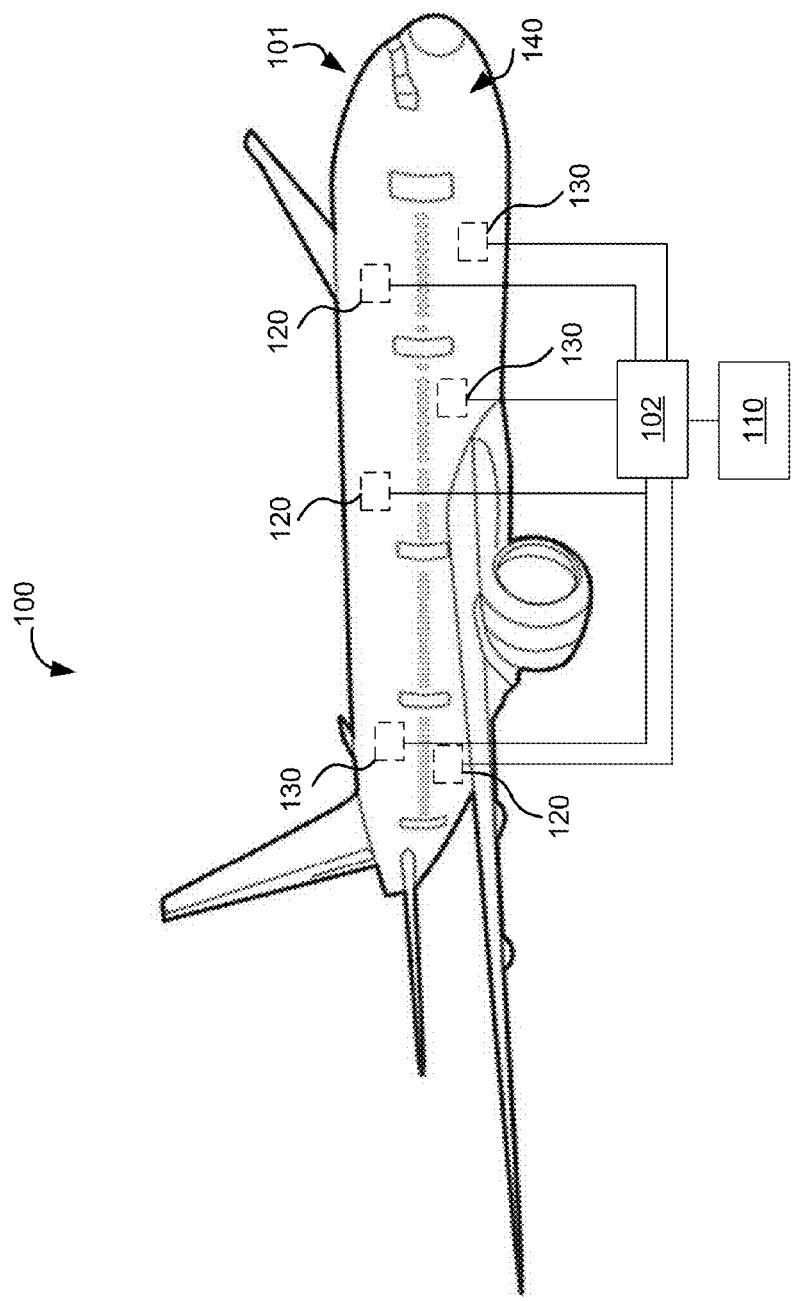
FIG. 1 illustrates an exemplary system for reducing turbulence on a vehicle using a multi-layered body system, according to an implementation of the invention.

FIG. 1 illustrates an exemplary system 100 for reducing turbulence on a vehicle 101 using a multi-layered body system 104, according to an implementation of the invention. System 100 may include a vehicle 101, a communication link 102, a computer system 110, one or more sensors 120, one or more mitigation devices 130, multi-layered body system 104, and/or other components. Vehicle 101 is depicted as an airplane in FIG. 1 and other examples throughout for example and not limitation. However, vehicle 101 may include other types of vehicles as well, such as, without limitation, a train, a marine (including surface and submarine) vessel, and/or other vehicle that may experience turbulence. Furthermore, examples used herein throughout may refer to turbulent force for convenience and not limitation. Other types of external forces may be mitigated as well.

Multi-layered body system 104 may include multiple layers of bodies, such as an inner body that at least partially encloses cabin space for occupants and an outer body that at least partially encloses the inner body and is exposed to the environment such that it is subjected to turbulent force (i.e., turbulence) during flight. In some implementations, during operation (e.g., flight), the inner body maybe continuously electromagnetically levitated with respect to the outer body (e.g., at least some portions of the inner body do not contact the outer body due to EM force applied to the inner body and/or the outer body). In this manner, turbulent forces imposed on the outer body may be absorbed by the outer body and not felt (or at least reduced) at the inner body.

In some implementations (whether or not such continuous EM levitation is employed), a computer system 110 may receive sensor information via communication link 102 from sensors 120. Computer system 110 may detect turbulence imparted on the outer body based on the sensor information. In response, computer system 110 may generate a mitigating signal that causes a mitigating device 130 to generate a counteracting force that reduces movement of the outer body so that the impact of the turbulence on the inner body is reduced or eliminated. For example, in implementations in which the inner body is magnetically levitated within outer body during operation, system 100 may cause mitigation devices 130 to output a counteracting force that maintains (or attempts to maintain) a minimum separation distance between the inner body and the outer body. This may allow the outer body to absorb the impact of the turbulent force and eliminate or reduce transfer of the turbulent force to the inner body, which in turn eliminates or reduces the turbulent force felt by passengers (and/or objects) within a cabin space inside the inner body. In other implementations in which continuous EM levitation is not employed, the counteracting force may act in the same manner (e.g., attempt to maintain a minimum separation distance between the inner body and the outer body).

In some implementations, sensors 120 may include a measurement device that measures one or more components a force vector (e.g., a turbulent force vector corresponding to turbulence that vehicle 101 experiences). The measurement device may measure, for example, a magnitude, a direction, and/or other component of a force vector. For example, and without limitation, sensors 120 may include a gyroscope, an accelerometer, and/or other type of sensor device that can detect and measure one or more components of a force vector.

In some implementations, mitigating devices 130 may include a device that is capable of outputting a force (in particular, a counteracting force). For example, and without limitation, a mitigating device 130 may include an electromagnet that may variably emit different strengths of EM fields/forces (or emit a constant EM force), a hydraulic device that may variably emit different forces based on different hydraulic pressure forces (or based on a constant hydraulic pressure force), and/or other types of devices that can variably or constantly generate a counteracting force. Such a force may attempt to, in some implementations, maintain a minimum separation distance between the inner body and the outer body.

Having described a high level overview of various system components, attention will now be turned to a more detailed description of various implementations of the invention, including turbulence detection and mitigation and various configurations of system components.

Multi-Layered Body System

Figure 2:
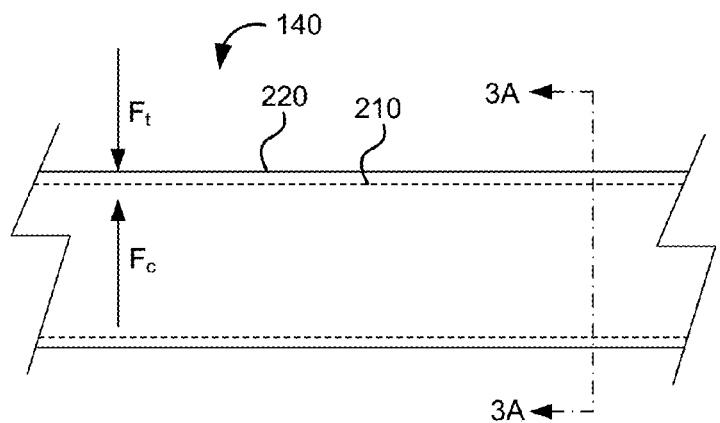
FIG. 2 illustrates a schematic block diagram of a multi-layered body system, according to an implementation of the invention.

FIG. 2 illustrates a schematic diagram of a side view of a multi-layered body system 104, according to an implementation of the invention. Multi-layered body system 200 may include an inner body 210 and an outer body 220. Other numbers of layered bodies may be used as well. It should further be noted that multi-layered body system need not be completely contiguous. For example, inner body 210 may include multiple segments that are joined or otherwise connected together during manufacturing. Likewise, outer body 220 may include multiple segments that are joined or otherwise connected together during manufacturing. Furthermore, outer body 220 may but need not necessarily completely encompass inner body 210. External components (e.g., wings, tail sections, antenna, etc.) may be attached to and/or be integrated with the outer body 220. As such, these and other external components, in some instances, may also be part of the multi-layered body system 104 and therefore have multiple layers of bodies. In some implementations, multi-layered body system 104 may include or be attached to certain segments that are not constructed of multiple layers. For example, and without limitation, a cockpit section may not be constructed of multiple layers.

In some instances, a platform system may extend from the inner body to the outer body to permit passage through throughways (e.g., doors). This may allow passengers and crew members to traverse the throughways. The platform system may be compliant and fixedly attached to the inner body and the outer body. In other implementations, the platform system may be removably attached to either or both the inner body and the outer body. In these implementations, the platform system may extend to connect the inner body and the outer body (e.g., when EM levitation is de-activated) and retract to disconnect the inner body and the outer body (e.g., when EM levitation is activated). In some implementations, the platform system may extend and connect the inner and outer bodies based on pilot discretion after the vehicle has come to a complete rest or before the trip has started. In some implementations, no platform system is used. Instead, a cover may be manually or automatically placed to permit passage without any gaps at the throughway between the inner body and the outer body.

In some implementations, the outer body may have outer windows that are larger than inner windows that are placed at the inner body. In this manner, the inner windows may have a continuous view of the outside even when the outer body shifts with respect to the inner body during turbulence.

During operation (e.g., flight) of a vehicle that employs multi-layered body system 104, a turbulent force ($F_t$) may be imposed upon at least a portion of outer body 220. The direction (and magnitude) of the turbulent force $F_t$ may vary depending on environmental and other conditions through which a vehicle that employs the multi-layered body system 200 travels. As would be appreciated, several turbulent forces $F_t$ (each of which may be mitigated as described herein) may be simultaneously imposed upon the same or different portion of outer body 220.

The vehicle (e.g., vehicle 101 illustrated in FIG. 1) may actively and/or passively generate a counteracting force ($F_c$) to counteract the turbulent force $F_t$. The direction and magnitude of the counteracting force $F_c$ may vary depending on the turbulent force $F_t$. For example, although illustrated as being directionally opposing and parallel to turbulent force $F_t$, counteracting force $F_c$ may be directed at an offset angle (e.g., not parallel) with respect to turbulent force $F_t$, and/or directed to a different location than the location at which the turbulent force was detected. Furthermore, the magnitude of the counteracting force $F_c$ may be proportional or equal to the turbulent force $F_t$. The counteracting force $F_c$ may originate from mitigating devices 130 and/or passive mitigation components (i.e., components that dampen the turbulent force $F_t$ without active mitigation from a mitigating device 130), as will be described further below.

FIGS. 3A-F illustrate various cross-sectional views of the multi-layered body system 104 having an inner body 210 and an outer body 220. The various components and configuration of components illustrated in FIGS. 3A-F are illustrative and exemplary only. Other numbers of components and configurations of components may be used according to particular needs and based on the disclosure herein.

Figures 3A, 3B:
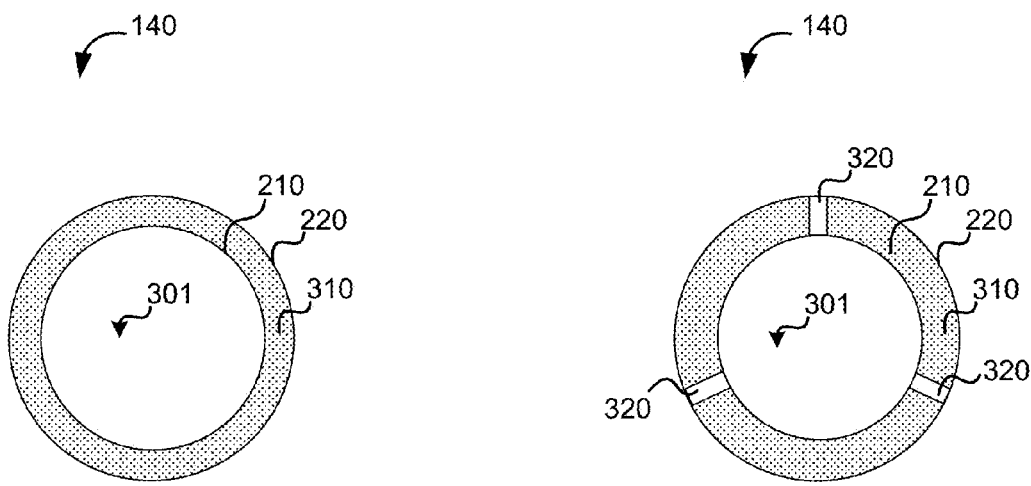
FIG. 3A illustrates a cross-sectional view of a multi-layered body system, according to an implementation of the invention.
FIG. 3B illustrates a cross-sectional view of a multi-layered body system having a suspension, according to an implementation of the invention.

FIG. 3A illustrates a cross-sectional view of a multi-layered body system 104, according to an implementation of the invention. The outer portion of inner body 210 and the inner portion of outer body 220 may define a space 310. Space 310 may be filled with a gas (including ambient air, pressurized gas other than ambient air, etc.), a liquid (including a non-Newtonian liquid), a semi-solid, and/or other compositions. The inner portion of inner body 210 may define an area 301 in which passengers, cargo, and other objects may be transported. For example, the cabin of an airplane may be within area 301.

FIG. 3B illustrates a cross-sectional view of a multi-layered body system 104 having a suspension 320, according to an implementation of the invention. Suspension 320 may suspend inner body 210 with respect to outer body 220. Each suspension 320 may include coils, struts, springs, linkages, and/or other structures that can passively dampen vibrations or otherwise hold inner body 210. In some implementations, suspension 320 may persistently hold inner body 210 in place. In some implementations (e.g., in implementations in which inner body 210 is magnetically levitated within outer body 220), suspension 320 may not persistently hold inner body 210 in place. For example, in these implementations, suspension 320 may be deployed to hold inner body 210 when active mitigation is deactivated (e.g., when electromagnets that levitate inner body 210 within outer body 220 are disengaged).

Figure 3C:
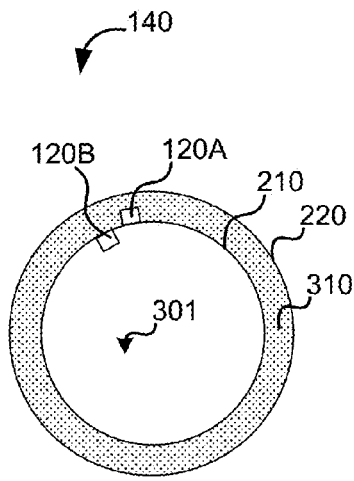
FIG. 3C illustrates a cross-sectional view of a multi-layered body system having sensors coupled to an inner body, according to an implementation of the invention.

FIG. 3C illustrates a cross-sectional view of a multi-layered body system 104 having sensors 120 coupled to an inner body 210, according to an implementation of the invention. In the illustrated implementation, a sensor 120A may be coupled to an outer portion of inner body 210 and/or a sensor 120B may be coupled to an inner portion of inner body 210.

Figure 3D:
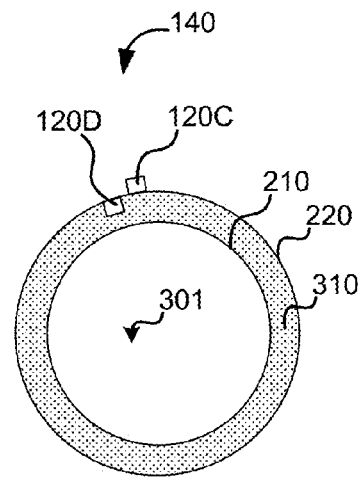
FIG. 3D illustrates a cross-sectional view of a multi-layered body system having sensors coupled to an outer body, according to an implementation of the invention.

FIG. 3D illustrates a cross-sectional view of a multi-layered body system 104 having sensors 120 coupled to an outer body 220, according to an implementation of the invention. In the illustrated implementation, a sensor 120C may be coupled to an outer portion of outer body 220 and/or a sensor 120D may be coupled to an inner portion of outer body 220.

Figure 3E:
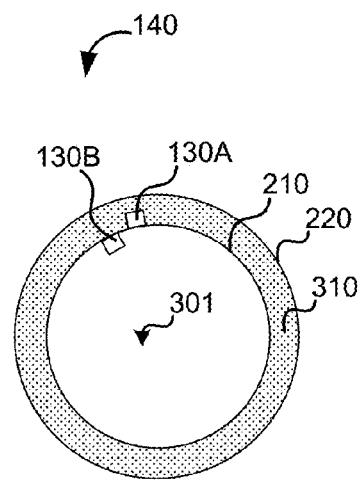
FIG. 3E illustrates a cross-sectional view of a multi-layered body system having mitigation devices coupled to an inner body, according to an implementation of the invention.

FIG. 3E illustrates a cross-sectional view of a multi-layered body system 104 having mitigation devices 130 coupled to an inner body 210, according to an implementation of the invention. In the illustrated implementation, a mitigating device 130A may be coupled to an outer portion of inner body 210 and/or a mitigating device 130B may be coupled to an inner portion of inner body 210.

Figure 3F:
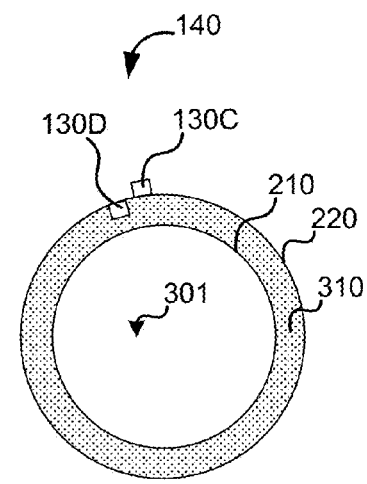
FIG. 3F illustrates a cross-sectional view of a multi-layered body system having mitigation devices coupled to an outer body, according to an implementation of the invention.

FIG. 3F illustrates a cross-sectional view of a multi-layered body system 104 having mitigation devices 130 coupled to an outer body 220, according to an implementation of the invention. In the illustrated implementation, a mitigating device 130C may be coupled to an outer portion of outer body 220 and/or a mitigating device 130D may be coupled to an inner portion of outer body 220. Various combinations and configurations of the foregoing placement of sensors 120 and mitigating devices 130 may be used as well.

Computer System 110

Figure 4:
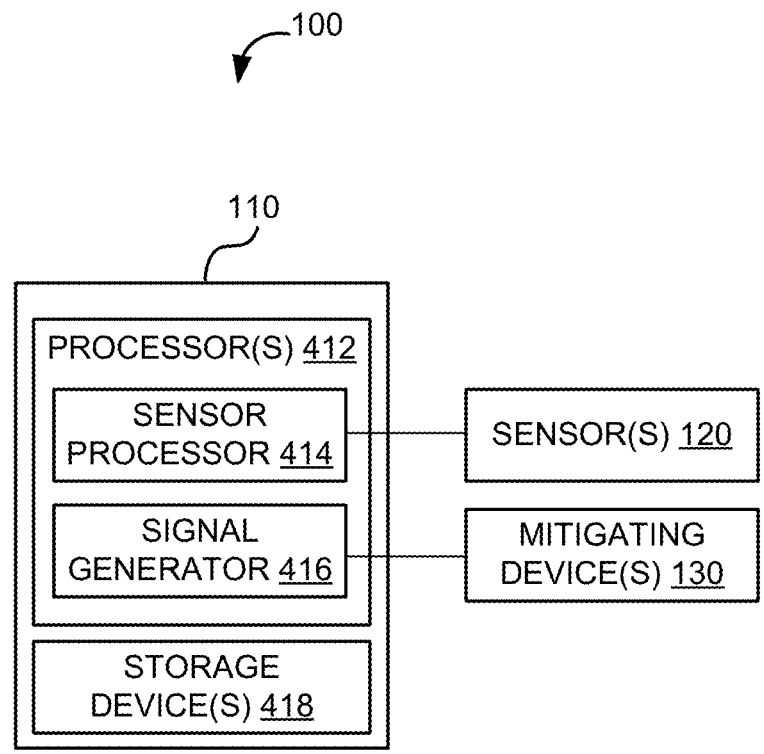
FIG. 4 illustrates a schematic block diagram of a computer system that controls active mitigation for a vehicle having a multi-layered body system, according to an implementation of the invention.

FIG. 4 illustrates a schematic block diagram of a computer system 110 that controls active mitigation, according to an implementation of the invention. Computer system 110 may include one or more processors 412 (also interchangeably referred to herein as processors 412, processor(s) 412, or processor 412 for convenience), one or more storage devices 418 (which may store instructions that program processor 412), and/or other components. Processors 412 may be programmed by one or more computer program instructions. For example, processors 412 may be programmed by a sensor processor 414, a mitigating signal generator 416 (also referred to interchangeably herein as "signal generator 416"), and/or other instructions. As used herein, for convenience, the various instructions will be described as performing an operation, when, in fact, the various instructions program the processors 412 (and therefore computer system 110) to perform the operation. Alternatively or additionally, sensor processor 414 and/or mitigating signal generator 416 may be configured as a hardware component such as an embedded system that processes sensor information and generates mitigating signals.

Localizing and Parallelizing Sensor Signals

In some implementations, sensor processor 414 may obtain sensor information from one or more sensors 120 via communication link 102. For example, sensor processor 414 may receive sensor information from sensors 120 when such sensor information is available (e.g., when sensors 120 detect turbulence and transmit the sensor information) and/or periodically poll sensors 120.

Sensors 120 may detect turbulence imparted on multi-layered body system 104 and generate sensor information that indicates a measurement of the detected turbulence. Computer system 110 may obtain the sensor information from sensors 120 via communication link 102. Based on the sensor information, computer system 110 may generate a mitigating signal and cause the mitigating signal to be transmitted to a mitigating device 130 via communication link 102. Based on the mitigating signal, mitigating device 130 may generate a mitigating force upon multi-layered body system 104 that counteracts the turbulence. For instance, the mitigating force may counteract movement of the outer body so that the impact of the turbulence on the inner body is reduced or eliminated.

In some implementations, sensor processor 414 may localize the sensor information. For example, the sensor information may include (or be transmitted in association with) sensor identifying information that identifies the sensor 120 that generated the sensor information. Sensor processor 414 may consult a sensor registry (which may be onboard or network accessible) to obtain a location of the sensor 120 based on the sensor identifying information. The sensor identifying information may be stored in association with information that indicates the location of sensor 120 within vehicle 101. Alternatively or additionally, the sensor information may include (be transmitted in association with) information that indicates the location of sensor 120 within vehicle 101.

In some implementations, sensor processor 414 may execute multiple threads or other computer processes so that multiple sensor data streams may be handled simultaneously. For example, sensor processor 414 may process first sensor information from a first sensor 120 using a first thread and process second sensor information from a second sensor 120 using a second thread. Alternatively or additionally, sensor processor 414 may be distributed across multiple processors 412. In this manner, multiple turbulence events over different parts of the vehicle may be detected and mitigated.

Quantifying Turbulence

In some implementations, sensor processor 414 may quantify turbulence on vehicle 101 based on the obtained sensor information. For example, sensor processor 414 may determine one or more components of a turbulent force vector based on the sensor information. The one or more components of the turbulent force vector may include, without limitation, a magnitude, a direction, and/or other characterization of a force.

In some implementations, calculations may be performed by two or more sensors (e.g., a gyroscope and an accelerometer). Sensor processor 414 may convert the sensor information (e.g., gyroscope and accelerometer data) to calculate the magnitude and angle of the net turbulent force acting on the plane, thus activating the system of mitigating devices to offset the force of turbulence. To find the maximum magnetic force required during flight, the average weight of a vehicle (e.g., a Boeing 737 Next Gen) may be used to calculate the greatest net force of turbulence which could be experienced in any dimension. Using the plane mass and turbulence statistics provided by the FAA, the greatest net force (of turbulence) that the system would have to account for may be determined (e.g., for the Boeing 737 Next Gen). The greatest net force may be used as an upper limit to determine which mitigating devices 130 (and the force output thereof) may be required for a given application. For instance, different vehicles may be outfitted with different mitigating devices depending on the greatest net force that may be imposed upon the vehicle.

In some implementations, a vehicle operator (e.g., pilot) may be able to proactively mitigate turbulent forces by providing an indication to signal generator 416 to control one or more mitigation devices 130. For example, if a pilot anticipates turbulence (e.g., based on weather charts, radar returns, and/or real-time reports from other pilots), the pilot may adjust an offset that causes the mitigation devices to adjust the separation distance between the inner and outer bodies. If turbulent force is expected on at a particular side of the vehicle, the offset may cause an increase in the separation distance between the outer and inner bodies at that location. Active mitigation as described herein would then operate to actively mitigate the turbulent force to return to either the pre-proactive mitigation state or the pro-active mitigation state to counteract the turbulent force. As used herein throughout, the term "state" refers to the separation distance between the inner and outer bodies at one or more locations of the multi-layer body system.

Active Mitigation

In an implementation, mitigating signal generator 416 may determine, based on the sensor information, that a counteracting force should be applied to mitigate turbulence imposed upon vehicle 101. Responsive to such a determination, mitigating signal generator 416 may generate a mitigating signal that causes a mitigating device 130 to output the counteracting force. For example, and without limitation, the mitigating signal may include a power signal that drives one or more mitigating devices 130, a set of computer executable instructions that are executed at a mitigating device 130, and/or other types of signals that cause a mitigating device 130 to produce a force. Mitigating signal generator 416 may vary one or more characteristics of the mitigating signal to vary the level of force that is to be output by mitigating device 130.

In a particular example, in implementations in which mitigating device 130 includes an electromagnetic device, the power signal may be varied to vary the magnetic force that is output by the electromagnetic device. As such, the counteracting force that is applied may be varied based on and responsive to the level of turbulent force. For a given turbulent force that is detected, mitigating signal generator 416 may generate a single mitigating signal to be applied to one or more mitigating devices 130. For a given turbulent force that is detected, mitigating signal generator 416 may generate multiple mitigating signals, each mitigating signal having a different set of characteristics than another one of the mitigating signals, and each mitigating signal to be applied to one or more mitigating devices 130.

Figure 5:
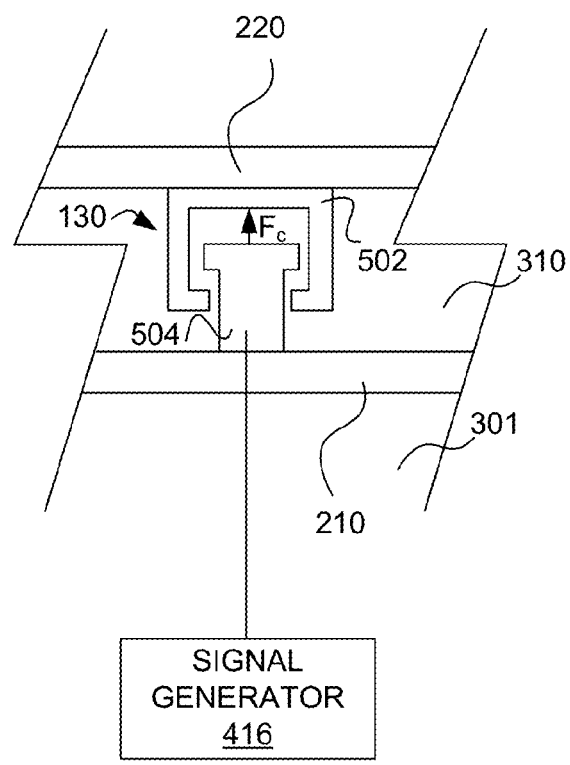
FIG. 5 illustrates a schematic block diagram of a mitigation device, according to an implementation of the invention.

FIG. 5 illustrates a schematic block diagram of a mitigation device 130, according to an implementation of the invention. In some implementations, mitigation device 130 may include a guide portion 502 and an EM portion 504. Although guide portion 502 is illustrated as being coupled to outer body 220, the guide portion may be coupled to inner body 210. Likewise, EM portion 504 may be coupled to outer body 220. Furthermore, the guide portion 502 may itself have an EM portion 502 such that mitigating device 130 includes two (or more) EM portions 502, at least some of which oppose one another.

The guide portion 502 may include a composition that is conducive to receiving EM fields from EM portion 504. Generally, though not necessarily, guide portion 502 may have a polarity that is reversed with respect to the EM field output by EM portion 504. EM portion 504 may be energized by a mitigating signal (e.g., electrical current) from signal generator 416, which may be configured as an intelligent (programmed) power modulator and a power source.

Figure 6:
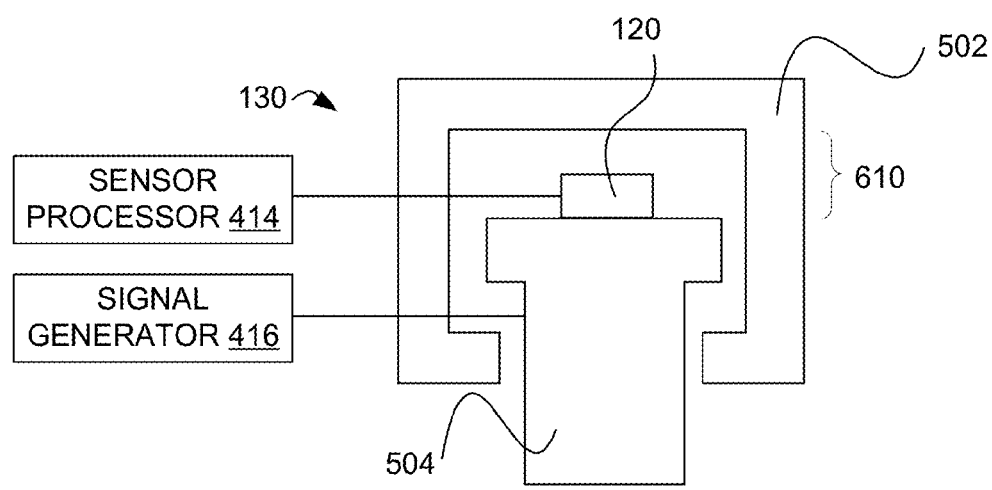
FIG. 6 illustrates a schematic block diagram of a mitigation device with a sensor, according to an implementation of the invention.

FIG. 6 illustrates a schematic block diagram of a mitigation device 130 with a sensor 120, according to an implementation of the invention. Sensor 120 may be integrally combined with or be attached to mitigation device 130. In either configuration, sensor 120 may, in the illustrated implementation, obtain a measurement that indicates a distance between guide portion 502 and EM portion 504. In this implementation, sensor 120 may include a LASER range finder, a LIDAR range finder, a RADAR, and/or other distance determining sensor. The distance may be a proxy for the minimum separation to be maintained between outer body 220 and inner body 210. Put another way, the minimum separation to be maintained between outer body 220 and inner body 210 may be a function of the minimum separation between guide portion 502 and EM portion 504.

If the minimum separation is breached, signal generator 416 may determine that turbulent force is being imposed on outer body 220, compressing outer body 220 toward inner body 210 (e.g., "toward" being defined as inward toward the inner body from the point of contact of the turbulent force). As such, signal generator 416 may cause a mitigating signal to be generated and provided to EM portion 504 (of mitigating device 130), which generates a counteracting force $F_c$ to re-establish the minimum separation. In some instances, signal generator 416 may also or instead cause a counteracting force to be output by EM portion 504 even before the minimum separation has been breached. For example, signal generator 416 may cause a counteracting force to be output by EM portion 504 when any movement (or at least beyond a predefined amount of movement) of outer body 220 toward inner body 210 is detected. In this manner, signal generator 416 may continuously (e.g., at preset intervals) monitor sensor information processed by sensor processor 414 and cause corrective counteracting forces to be output responsive to sensor information indicating that movements has been detected. This may not only reduce or eliminate turbulence felt at the inner body 210, but also reduce general vibration (e.g., from external engines), imposed on the inner body.

Local and Global Mitigation

In an implementation, mitigating signal generator 416 may generate a mitigating signal that locally or globally mitigates turbulence. To locally mitigate turbulence, for example, mitigating signal generator 416 may transmit one or more mitigating signals to a localized set of (e.g., one or more, but less than all) available mitigating devices 130. To globally mitigate turbulence, mitigating signal generator 416 may transmit one or more mitigating signals to all available mitigating devices 130. In either case, an available mitigating device 130 may, based on and responsive to the mitigating signal, generate a counteracting force. A mitigating device 130 may be available when it is able to generate a counteracting force based on the mitigating signal.

It should be noted that multiple mitigation devices 130 may be controlled by a single signal generator 416 (which may be onboard the mitigation device or external to the mitigation device). In this implementation, mitigation devices 130 may act as a network of smart devices that can mitigate turbulence for its own respective area of vehicle 101. Alternatively or additionally, some mitigation devices 130 may each be controlled by a single signal generator 416, which can coordinate mitigation across multiple mitigation devices. Furthermore, each mitigation device 130 may receive sensor information from remote sensors 120 or may have sensors 120 integrally part of or connected to the mitigation device.

In an implementation, each mitigating device 130 may generate, either independently or in coordination with other mitigating devices 130, a counteracting force so that a certain separation distance between the inner body and outer body is maintained. For example, turbulent force may cause the outer body to move downward, causing the distance between the inner body and the outer body to decrease at a first location of the multi-layer body system and increase at a second location of the multi-layer body system (because the outer body moves with respect to the inner body in response to the turbulent force). A first mitigating device 130 may generate a counteracting force that causes the inner body and the outer body to move away from one another at the first location. Meanwhile, a second mitigating device 130, which may be across from the first mitigating device 130, may generate a counteracting force that causes the inner body and the outer body to move toward each one another at the second location. The action of the first and second mitigating devices 130 may be performed individually or in coordination with each other to produce a net effect of returning the inner body and the outer body to a desired state (e.g., a separation distance at the first and second locations that existed prior to the turbulent force).

Figure 7:
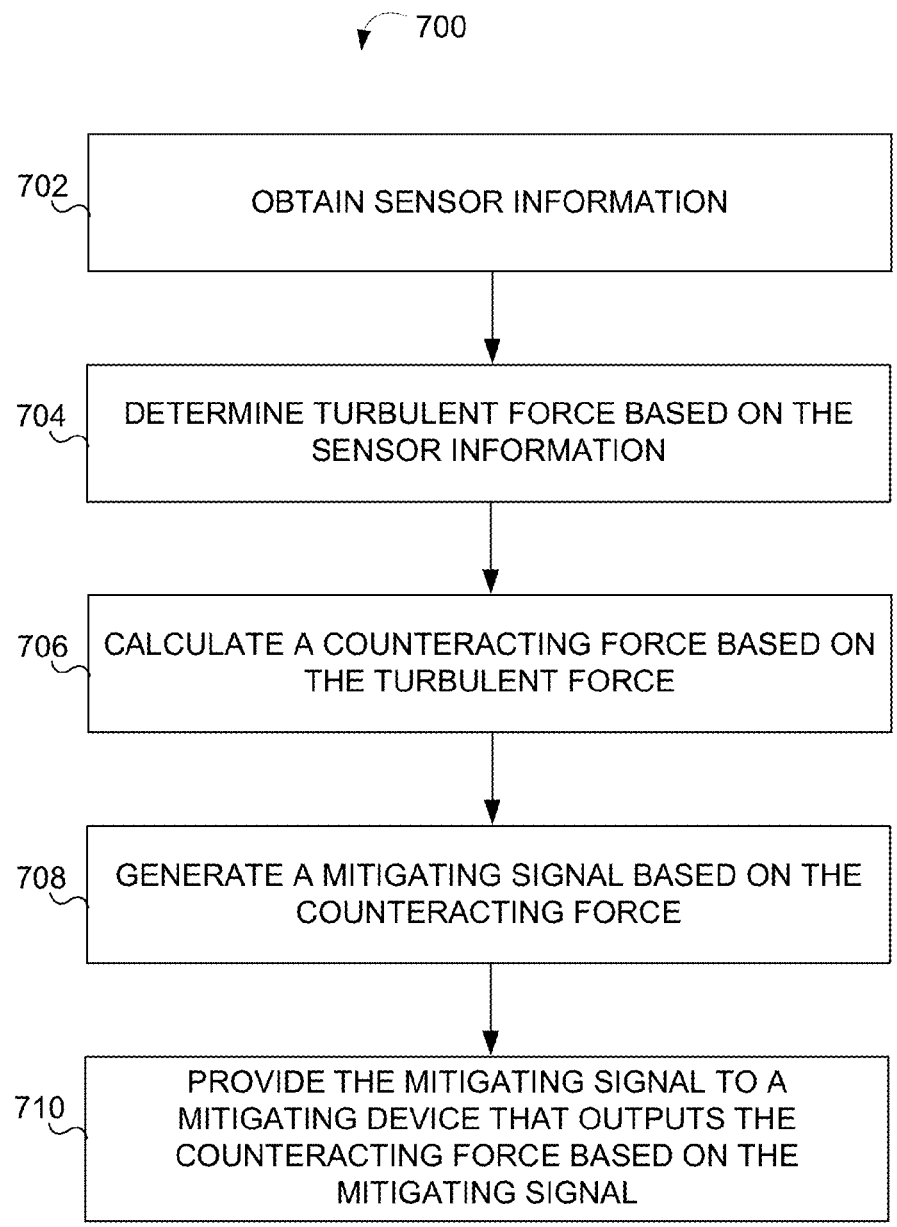
FIG. 7 depicts a process of detecting and mitigating turbulence, according to an implementation of the invention.

FIG. 7 depicts a process 700 of detecting and mitigating turbulence, according to an implementation of the invention. The various processing operations and/or data flows depicted in FIG. 7 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 702, process 700 may include obtaining sensor information.

In an operation 704, process 700 may include determining turbulent (or other external) force based on the sensor information.

In an operation 706, process 700 may include calculating a counteracting force based on the turbulent force.

In an operation 708, process 700 may include generating a mitigating signal based on the counteracting force to be applied.

In an operation 710, process 700 may include providing a mitigating signal to a mitigating device that outputs the countering force based on the mitigating signal.

Figure 8:
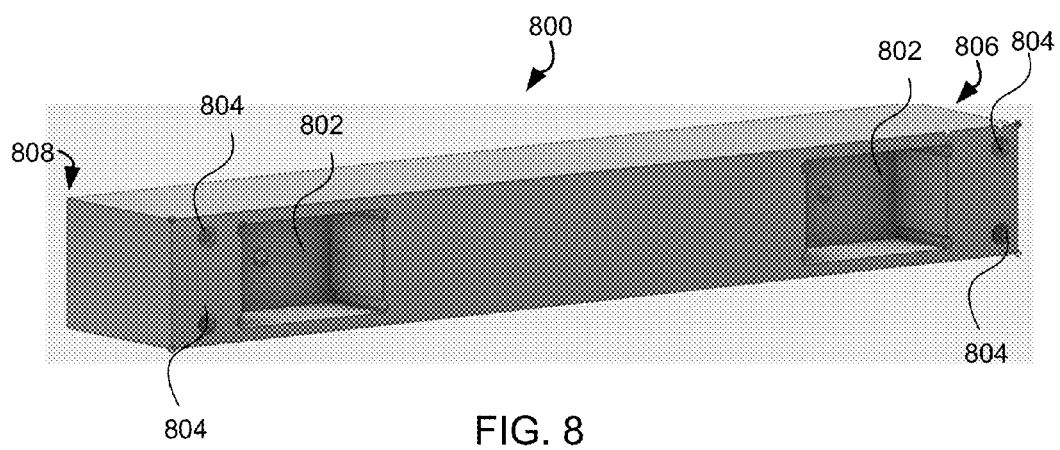
FIG. 8 depicts a perspective view, in cross-section, of a portion of a body support beam that houses a mitigating device, according to an implementation of the invention.

FIG. 8 depicts a perspective view, in cross-section, of a portion of a body support beam 800 that houses a mitigating device, according to an implementation of the invention. Body support beam may include a proximal end 806 and a distal end 808. In some implementations, a body support beam 800 may include a mitigating device receptacle 802 that houses a mitigating device, such as an electromagnet. Another body support beam (not illustrated) may be joined together with body support beam 800 such that each mitigating device receptacle, when aligned together, encapsulates the mitigating device. The two body support beams may be mechanically joined together by bolts, screws, or other fasteners that are inserted through through-holes 804. Alternatively or additionally, the two body support beams may be joined together by welding. In some implementations, a mitigating device receptacle may be bored into a single support beam such that two portions of support beams need not be fastened together. In these implementations, the mitigating device receptacle may be covered by a cover portion (or not covered at all).

Figure 9:
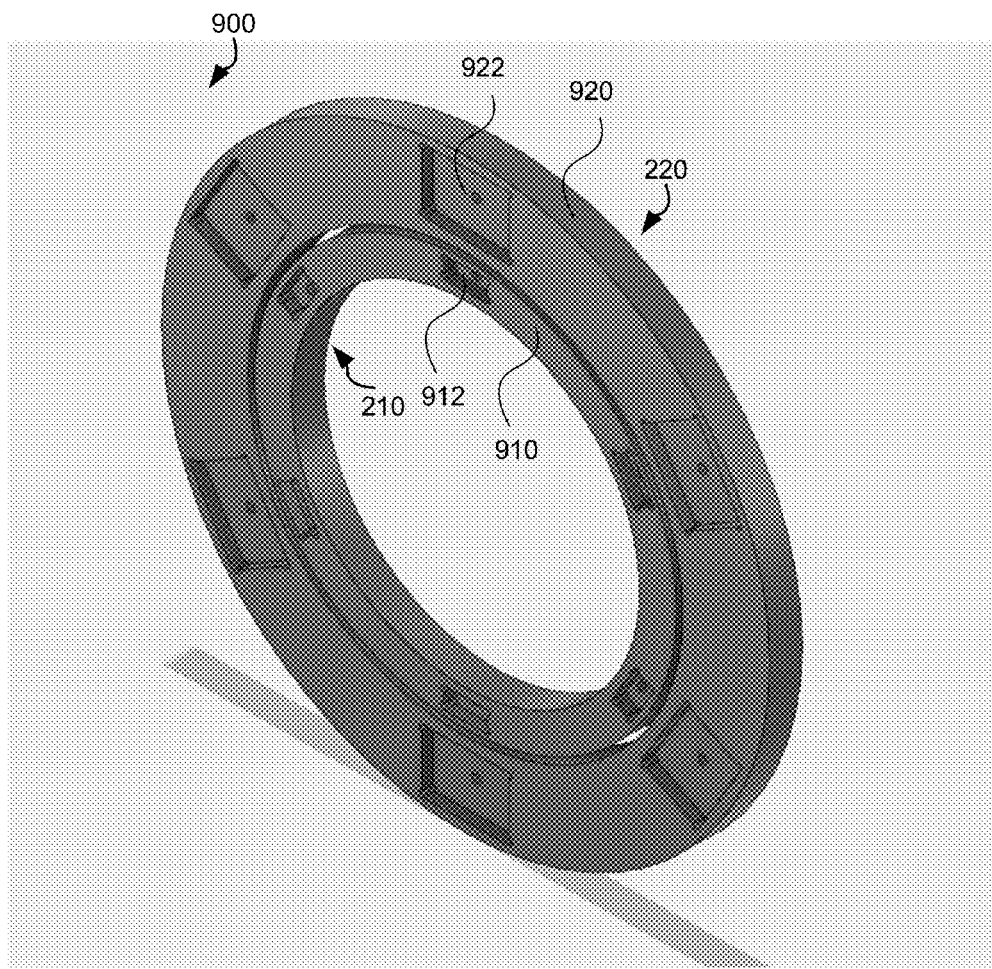
FIG. 9 depicts a perspective view of a multi-layer body support subsystem, according to an implementation of the invention.

FIG. 9 depicts a perspective view of a multi-layer body support subsystem 900, according to an implementation of the invention. Multi-layer body support subsystem 900 may include an outer body support 920 and an inner body support 910. Outer body support 920 may include a plurality of beam retaining grooves 922 (only one of which is labeled in FIG. 9 for convenience), which may be notched into outer body support 920 or cast with such support grooves during manufacturing. One beam retaining groove 922 may be configured to receive a proximal end 806 of body support beam 800. Another beam retaining groove (not illustrated) from another outer body support (not illustrated) may be configured to receive a distal end 808 of body support beam. The outer portion of outer body supports 920 and body support beam(s) 800 may be encased in an outer shell (not illustrated), which forms the shape of a vehicle. In these implementations, outer body 210 may comprise a plurality of outer body supports 920, a plurality of body support beam(s) 800 that are retained by the outer body supports, and the outer shell.

The inner body support 910 may include a plurality of beam retaining grooves 912 (only one of which is labeled in FIG. 9 for convenience) that are manufactured and function in a manner similar to that of outer body support 920. For example, body support beam(s) 800 may be retained by beam retaining grooves 912. An inner portion of the inner body supports 910 and corresponding body support beam(s) 800 may be encased in an inner shell, which may form the shape of the cabin for passengers and/or cargo. In some instances, the outer portion of the inner body supports 910 and corresponding body support beam(s) 800 may be encased by a shell as well. In some implementations, the body support beam(s) 800 retained by inner body supports 910 may not include a mitigating device. In these implementations, such body support beam(s) 800 may not have mitigating device receptacles. In these implementations, only the outer body will have mitigating devices. In some implementations, only the inner body will have mitigating devices. In some implementations, both the inner body and the outer body will have mitigating devices. In some implementations, the body support beam(s) 800 for both the inner body support 910 and the outer body support 920 may be similarly sized. In other implementations, the body support beam(s) 800 for both the inner body support 910 and the outer body support 920 may be differently sized (as illustrated in FIG. 9).

Although illustrated in FIG. 1 as a single component, computer system 110 may include a plurality of individual components (e.g., computer devices) each programmed with at least some of the functions described herein. The various instructions described herein are exemplary only. Other configurations and numbers of instructions may be used, so long as the processor(s) 412 are programmed to perform the functions described herein.

Furthermore, it should be appreciated that although the various instructions are illustrated in FIG. 1 as being co-located within a single processing unit, in implementations in which processor(s) 412 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 412 may be programmed by one or more additional instructions that may perform some or all of the functionality attributed herein to one of the instructions.

The various instructions described herein may be stored in a storage device 418, which may comprise random access memory (RAM), read only memory (ROM), and/or other memory. The storage device may store the computer program instructions (e.g., the aforementioned instructions) to be executed by processor 212 as well as data that may be manipulated by processor 412. The storage device may comprise floppy disks, hard disks, optical disks, tapes, or other storage media for storing computer-executable instructions and/or data.

The registries described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a communication link 102, which may include any one or more of, for instance, a hardwired link, a wireless network, the Internet, an intranet, a PAN (Personal Area Network), a LAN (Local Area Network), a WAN (Wide Area Network), a SAN (Storage Area Network), a MAN (Metropolitan Area Network), a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some implementations, only passive mitigation may be employed. Such passive mitigation may use only suspension 320, the composition of space 310, and/or other passive components that are not actively actuated to output a force. Furthermore, such passive mitigation may supplement active mitigation in various implementations. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims. As used herein throughout, the term "exemplary" is intended to convey "an example of."

What is claimed is:

1. A system that mitigates turbulent force imparted on a vehicle, the system comprising:
   a signal generator;
   a multi-layered body comprising an outer body and an inner body disposed within the outer body, the inner body comprising a compartment configured to house passengers or cargo of the vehicle, wherein the outer body comprises an outer body support comprising:
      a plurality of outer body supports including at least a first outer body support and a second outer body support, wherein the first outer body support comprises a first plurality of beam retaining grooves including at least a first beam retaining groove and a second beam retaining groove, and wherein the second outer body support comprises a second plurality of beam retaining grooves including at least a third beam retaining groove and a fourth beam retaining groove; and
      a plurality of body support beams including at least a first body support beam and a second body support beam, wherein a proximal end of the first body support beam is retained by the first beam retaining groove and a distal end of the first body support beam is retained by the third beam retaining groove, and wherein a proximal end of the second body support beam is retained by the second beam retaining groove and a distal end of the second body support beam is retained by the fourth beam retaining groove; and
   wherein the inner body comprises an inner body support comprising:
      a plurality of inner body supports including at least a first inner body support and a second inner body support, wherein the first inner body support comprises a first plurality of inner beam retaining grooves including at least a first inner beam retaining groove and a second inner beam retaining groove, and wherein the second inner body support comprises a second plurality of inner beam retaining grooves including at least a third inner beam retaining groove and a fourth inner beam retaining groove; and
      a plurality of inner body support beams including at least a first inner body support beam and a second inner body support beam, wherein a proximal end of the first inner body support beam is retained by the first inner beam retaining groove and a distal end of the first inner body support beam is retained by the third inner beam retaining groove, and wherein a proximal end of the second inner body support beam is retained by the second inner beam retaining groove and a distal end of the second inner body support beam is retained by the fourth inner beam retaining groove;
   an electromagnet device coupled to the multi-layered body, the electromagnetic device configured to receive a signal from the signal generator, and, responsive to the signal, generate an electromagnetic (EM) force that causes the inner body to levitate within the outer body; and
   a sensor coupled to the multi-layered body, the sensor configured to detect a turbulent force imparted to at least one location of the multi-layered body, wherein the turbulent force causes a movement of the outer body or the inner body with respect to one another at the at least one location;
   wherein the signal generator is further configured to generate a mitigating signal responsive to the detected turbulent force, and provide the mitigating signal to the electromagnet device,
   wherein the electromagnet device, responsive receipt of the mitigating signal, is further configured to output a counteracting force based on the mitigating signal, the counteracting force countering the movement of the outer body or the inner body with respect to one another at the at least one location.

2. The system of claim 1, wherein the turbulent force is imparted to the multi-layered body in a first direction, causing the outer body to move inward toward the inner body in the first direction, and wherein the counteracting force is applied in a second direction opposite the first direction.

3. The system of claim 2, wherein the electromagnet device comprises:
- a track portion, coupled to the outer portion, configured to receive the counteracting force; and
- an EM portion, coupled to the inner body, configured to generate the counteracting force, wherein the second direction causes the outer body to move away from the inner body at the at least one location, wherein the track portion and the EM portion do not contact each other when the EM force that causes the inner body to levitate within the outer body is applied.

4. The system of claim 3, the system further comprising:
- a second electromagnet device coupled to the multi-layered body, wherein the second electromagnet device is configured to generate a second counteracting force that causes the outer body to move toward the inner body at a second location of the multi-layered body, wherein the counteracting force and the second counteracting force together cause movement of the outer body in the same direction.

5. The system of claim 3, wherein the EM portion and the track portion are reversed in polarity with respect to one another.

6. The system of claim 3, wherein the sensor comprises a range finder coupled to the EM portion or the track portion, and wherein to detect the turbulent force, the sensor is configured to measure a distance between the EM portion and the track portion, and wherein the signal generator is further configured to maintain a pre-specified separation distance between the EM portion and the track portion and generate the mitigating signal responsive to a determination that the measured distance between the EM portion and the track portion is not equal to the pre-specified separation distance.

7. The system of claim 6, wherein the signal generator is configured to determine that the measured distance is greater than the separation distance, and wherein the counteracting force is applied to reduce the distance between the EM portion and the track portion to achieve the separation distance.

8. The system of claim 6, wherein the signal generator is configured to determine that the measured distance is less than the separation distance, and wherein the counteracting force is applied to increase the distance between the EM portion and the track portion to achieve the separation distance.

9. The system of claim 6, wherein the signal generator is configured to determine that the measured distance is less than the separation distance, and wherein the counteracting force is applied to increase the distance between the inner body and the outer body to achieve the separation distance.

10. The system of claim 1, the system further comprising:
- a retractable suspension configured to support the inner body on the outer body when the EM force is de-activated and retract when the EM force is activated.

11. The system of claim 1, wherein the signal comprises an electrical current that is continuously applied to the electromagnet during operation of the vehicle that includes the multi-layered body.

12. The system of claim 1, wherein the sensor comprises at least one of an accelerometer or a gyroscope.

13. The system of claim 1, wherein the sensor comprises a range finder.

14. The system of claim 13, wherein to detect the turbulent force, the sensor is configured to measure a distance between the inner body and the outer body, and wherein the signal generator is further configured to maintain a pre-specified separation distance between the inner body and the outer body and generate the mitigating signal responsive to a determination that the measured distance between the inner body and the outer body is not equal to the pre-specified separation distance.

15. The system of claim 14, wherein the signal generator is configured to determine that the measured distance is greater than the separation distance, and wherein the counteracting force is applied to reduce the distance between the inner body and the outer body to achieve the separation distance.

16. The system of claim 1, wherein the signal generator is configured to receive an indication to activate proactive mitigation, and responsive to the indication, cause the electromagnet device to generate a force that moves at least one of the outer body or the inner body prior to detection of the turbulent force by the sensor.

17. The system of claim 16, wherein the indication is received from an operator of the vehicle.

18. The system of claim 1, wherein the first body support beam comprises a mitigating device receptacle configured to house the electromagnet device.

19. A vehicle that mitigates turbulent force imparted on the vehicle, the vehicle comprising:
- a signal generator;
- a multi-layered body comprising an outer body and an inner body disposed within the outer body, the inner body comprising a compartment configured to house passengers or cargo of the vehicle, wherein the outer body comprises an outer body support comprising:
  - a plurality of outer body supports including at least a first outer body support and a second outer body support, wherein the first outer body support comprises a first plurality of beam retaining grooves including at least a first beam retaining groove and a second beam retaining groove, and wherein the second outer body support comprises a second plurality of beam retaining grooves including at least a third beam retaining groove and a fourth beam retaining groove; and
  - a plurality of body support beams including at least a first body support beam and a second body support beam, wherein a proximal end of the first body support beam is retained by the first beam retaining groove and a distal end of the first body support beam is retained by the third beam retaining groove, and wherein a proximal end of the second body support beam is retained by the second beam retaining groove and a distal end of the second body support beam is retained by the fourth beam retaining groove; and
- wherein the inner body comprises an inner body support comprising:
  - a plurality of inner body supports including at least a first inner body support and a second inner body support, wherein the first inner body support comprises a first plurality of inner beam retaining grooves including at least a first inner beam retaining groove and a second inner beam retaining groove, and wherein the second inner body support comprises a second plurality of inner beam retaining grooves including at least a third inner beam retaining groove and a fourth inner beam retaining groove; and
  - a plurality of inner body support beams including at least a first inner body support beam and a second inner body support beam, wherein a proximal end of the first inner body support beam is retained by the first inner beam retaining groove and a distal end of the first inner body support beam is retained by the third inner beam retaining groove, and wherein a proximal end of the second inner body support beam is retained by the second inner beam retaining groove and a distal end of the second inner body support beam is retained by the fourth inner beam retaining groove;

an electromagnet device coupled to the multi-layered body, the electromagnetic device configured to receive a signal from the signal generator, and, responsive to the signal, generate an electromagnetic (EM) force that causes the inner body to levitate within the outer body during operation of the vehicle.

* * * * *